United States Patent
Hoshihara et al.

(10) Patent No.: US 6,755,471 B2
(45) Date of Patent: Jun. 29, 2004

(54) SEAT DEVICE

(75) Inventors: Naoaki Hoshihara, Ohbu (JP); Yukifumi Yamada, Toyota (JP); Hideo Nihonmatsu, Anjo (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 10/369,633

(22) Filed: Feb. 21, 2003

(65) Prior Publication Data

US 2003/0178878 A1 Sep. 25, 2003

(30) Foreign Application Priority Data

Feb. 21, 2002 (JP) ........................................ 2002-045199

(51) Int. Cl.[7] .................................................. B60N 2/02
(52) U.S. Cl. ...................................................... 297/366
(58) Field of Search ................................ 297/362, 366, 297/367, 374, 376

(56) References Cited

U.S. PATENT DOCUMENTS

| | | | |
|---|---|---|---|
| 4,304,438 A | * | 12/1981 | Nardi |
| 5,725,452 A | * | 3/1998 | Droulon et al. |
| 6,007,152 A | * | 12/1999 | Kojima et al. |
| 6,039,400 A | * | 3/2000 | Yoshida et al. |
| 6,082,821 A | * | 7/2000 | Baloche et al. |
| 6,092,874 A | * | 7/2000 | Kojima et al. |
| 6,168,235 B1 | * | 1/2001 | Freund |
| 6,328,383 B2 | * | 12/2001 | Rohee et al. |
| 6,609,756 B2 | * | 8/2003 | Kojima et al. |

FOREIGN PATENT DOCUMENTS

JP          10-276850 A     10/1998

* cited by examiner

*Primary Examiner*—Milton Nelson, Jr.
(74) *Attorney, Agent, or Firm*—Burns, Doane, Swecker & Mathis, L.L.P.

(57) ABSTRACT

A seat device which includes a seat cushion frame provided in a seat cushion, a seatback frame provided in a seatback, an upper arm connected to the seatback frame, a lower arm rotatably connected to the upper arm and connected to the seat cushion frame, a lock mechanism for locking a rotation of the upper arm relative to the lower arm, a reclining device for adjusting an angle of the seatback frame relative to the seat cushion frame, a locking portion provided either one of the upper arm and the lower arm, a reinforcement member provided either on the seatback frame or the seat cushion frame opposing to said either one of the upper arm or the lower arm provided with the locking portion, and a portion to be locked provided on the reinforcement member. The portion to be locked and the locking portion are connected.

20 Claims, 4 Drawing Sheets

_US 6,755,471 B2_

SEAT DEVICE

This application is based on and claims priority under 35 U.S.C. §119 with respect to Japanese Patent Application No. 2002-045199 filed on Feb. 21, 2002, the entire content of which is incorporated herein by reference.

FIELD OF THE INVENTION

The present invention relates to a seat device which includes a reclining device for adjusting an angle of a seatback fixed to a frame of a seat. More particularly, the present invention pertains to a connecting construction between the reclining device and the frame of the seat of the seat device.

BACKGROUND OF THE INVENTION

A known seat device including a construction for connecting a seat frame and a reclining device is disclosed in Japanese Patent Laid-Open Publication No. H10-276850. The reclining device provided on the seat device includes an upper arm, a lower arm, and a lock mechanism which can lock the relative rotation between the upper arm and the lower arm. A plurality of projections for locking are formed on a side face of the upper arm and the lower arm. A plurality of holes are formed on a seatback frame and a seat cushion frame for constructing the seat frame. The seat frame and the reclining device are connected by fitting the projections for locking into the holes respectively and by welding. An inner gear for lock mechanism is formed on either one of the upper arm or the lower arm of the reclining device so that the plural projections for locking are positioned approximate to the rotation center of the reclining device, that is the inside of the inner gear.

As shown in FIG. 4, with the known seat device having a construction that a retractor of a seatbelt is built in the seatback, the seat frame is applied with the excessive load via the seatbelt at the collision of the vehicle. Generally, the seat frame is made from the steal plate thinner than the arm of the reclining device. With the connecting construction of the seat frame and the reclining device in the known seat device disclosed in Japanese Patent Laid-Open Publication No. H10-276850, the seat frame is likely to be deformed to be broken with a smaller load compared to the reclining device when the excessive load affects the seatback. Further, with the arm formed with the inner gear for the lock mechanism of the reclining device, the projections for locking are positioned approximate to the rotation center of the reclining device. Thus, particularly large load is applied to the portion of the seat frame contacting the projections for locking, which is a weakness for decreasing the strength of the device. Although the entire plate thickness of the seat frame may be increased in order to obviate the drawback in a known seat device, another drawback that the weight of the seat device is increased is generated with this method.

A need thus exists for a seat device which has high strength of connecting portions between a seat frame and a reclining device without increasing a weight of the seat device.

SUMMARY OF THE INVENTION

In light of the foregoing, the present invention provides a seat device which includes a seat cushion frame provided in a seat cushion, a seatback frame provided in a seatback, an upper arm connected to the seatback frame, a lower arm rotatably connected to the upper arm and connected to the seat cushion frame, a lock mechanism for locking a rotation of the upper arm relative to the lower arm, a reclining device for adjusting an angle of the seatback frame relative to the seat cushion frame, a locking portion provided either one of the upper arm and the lower arm, a reinforcement member provided either on the seatback frame or the seat cushion frame opposing to said either one of the upper arm or the lower arm provided with the locking portion, and a portion to be locked provided on the reinforcement member. The portion to be locked and the locking portion are connected.

According to another aspect of the present invention, a seat device includes a seat cushion frame provided in a seat cushion, a seatback frame provided in a seatback, an upper arm connected to the seatback frame, a lower arm rotatably connected to the upper arm and connected to the seat cushion frame, a lock mechanism for locking a rotation of the upper arm relative to the lower arm, a reclining device for adjusting an angle of the seatback frame relative to the seat cushion frame, a locking portion provided on the upper arm, a reinforcement member provided on the seatback frame opposing to the upper arm provided with the locking portion, and a portion to be locked provided on the reinforcement member. The portion to be locked and the locking portion are connected.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
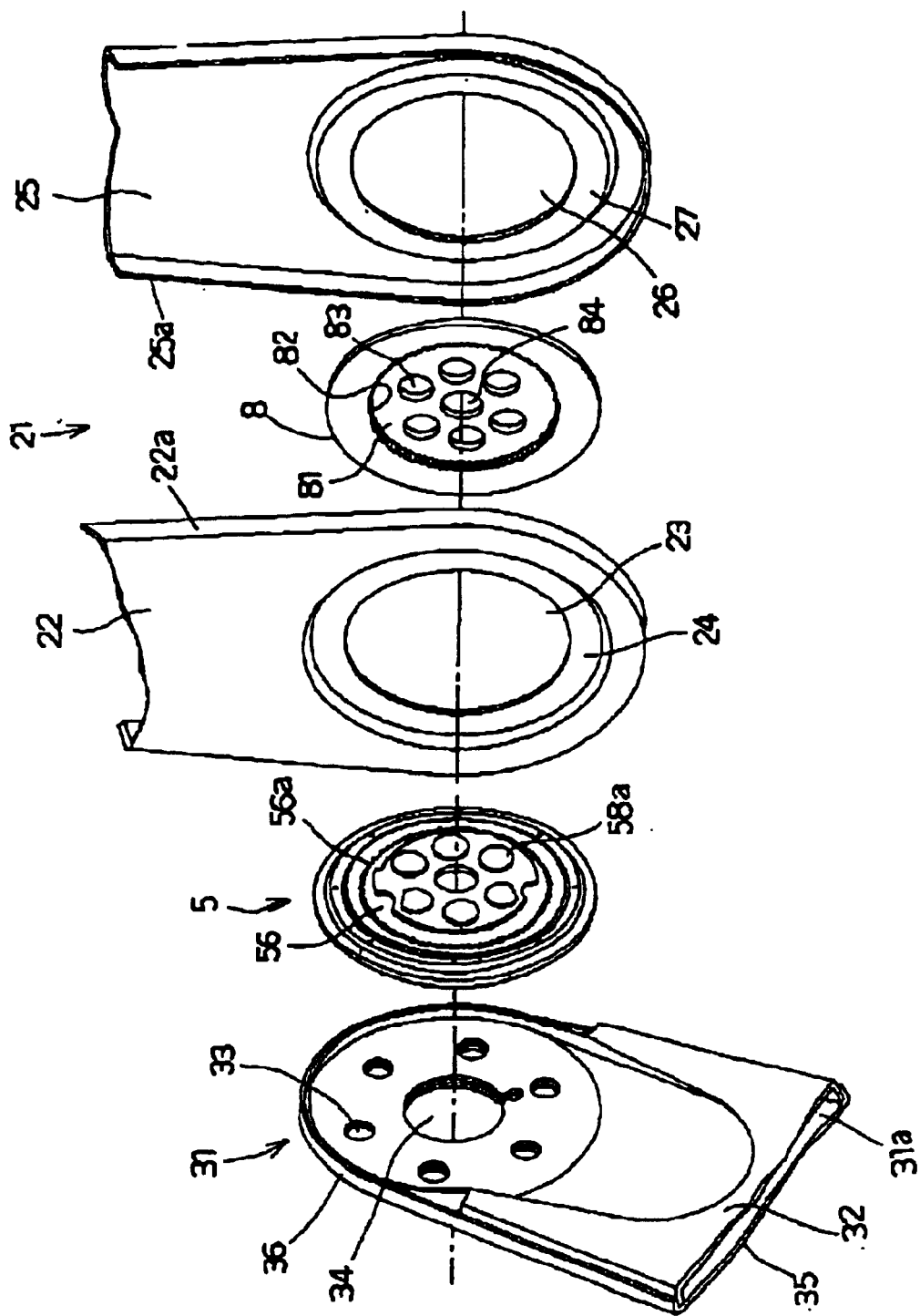
FIG. 1 is an exploded perspective view of a portion of a seat device according to an embodiment of the present invention.

One embodiment of a seat device will be explained with reference to the illustrations in the drawing figures. Referring to the illustrations in FIGS. 1–4, a seat device 10 will be explained.

Figure 4:
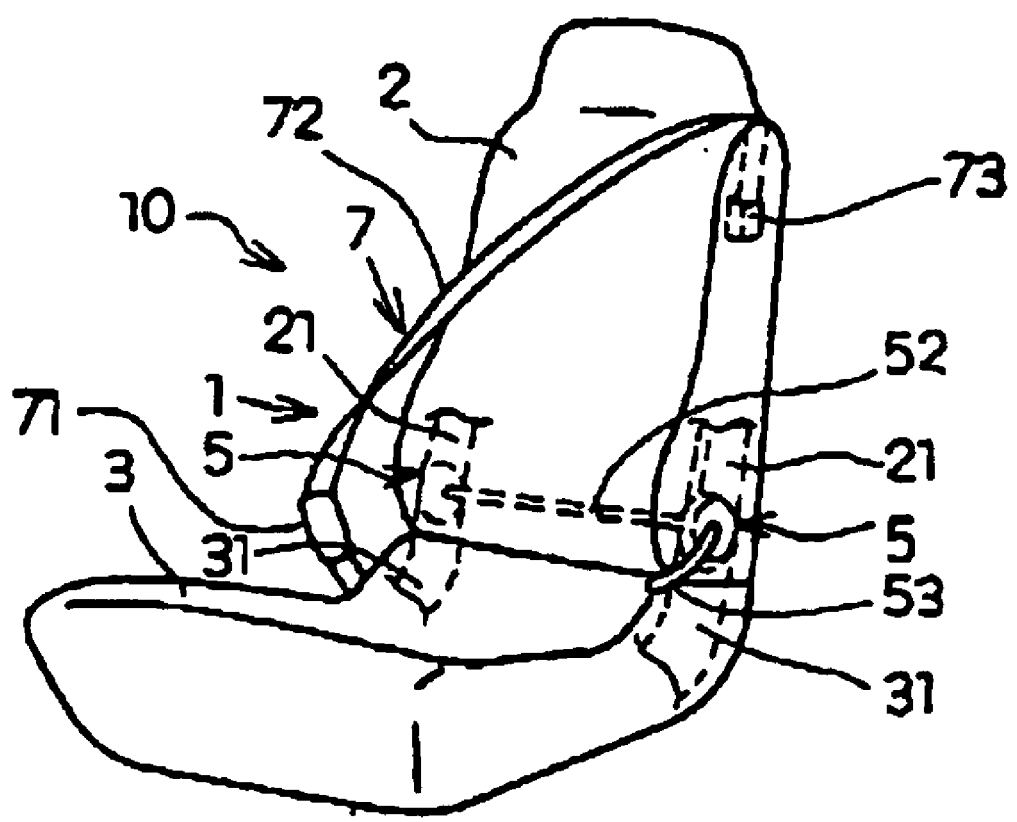
FIG. 4 is a perspective view of the seat device according to the embodiment of the present invention.

As shown in FIG. 4, the seat device 10 for a vehicle includes a seat 1 including a seatback 2 and a seat cushion 3. The seatback 2 includes seatback frames 21 serving as reinforcement members. The seat cushion 3 includes seat cushion frames 31 serving as reinforcement members. The seat device 10 further includes a pair of reclining devices 5 provided for connecting the seatback frame 21 and the seat cushion frame 31 and for adjusting an angle of the seatback 2 relative to the seat cushion 3 in a fore-aft direction (i.e., approximately right, left direction of FIG. 4) of the seat 1.

The reclining devices 5 are equipped on both right and left sides of the seat 1 respectively. The reclining device 5 includes a lock mechanism 51 (shown in FIG. 5). Respective lock mechanism 51 provided on the reclining devices 5 on the right and left sides of the seat 1 are cooperatively connected via a connection shaft 52. By operating an operation lever 53 connected to the connection shaft 52, the lock of the lock mechanism 51 is canceled to change the angle of the seatback 2.

A retractor 73 is provided in the seatback 2 of the seat 1. A seatbelt device 7 including a shoulder belt 72 detachable relative to a belt anchor 71 which is connected to the seat cushion 3 on one end and connected to the retractor 73 on the other end is constructed.

With the construction that the seatbelt device 7 is provided on the seat 1, the excessive impact load is applied to the seatback frames 21, the reclining devices 5, and the seat cushion frames 31 by the transmission of the excessive impact load from the seatbelt device 7 to the seatback 2 at the vehicle collision from the front and by the occupant crushed against the seatback 2 at the vehicle collision from the back. Thus, it is required to ensure the sufficient strength of the connected portions between the seatback frame 21, the reclining device 5, and the seat cushion frame 31 for bearing the impact load.

Figure 2:
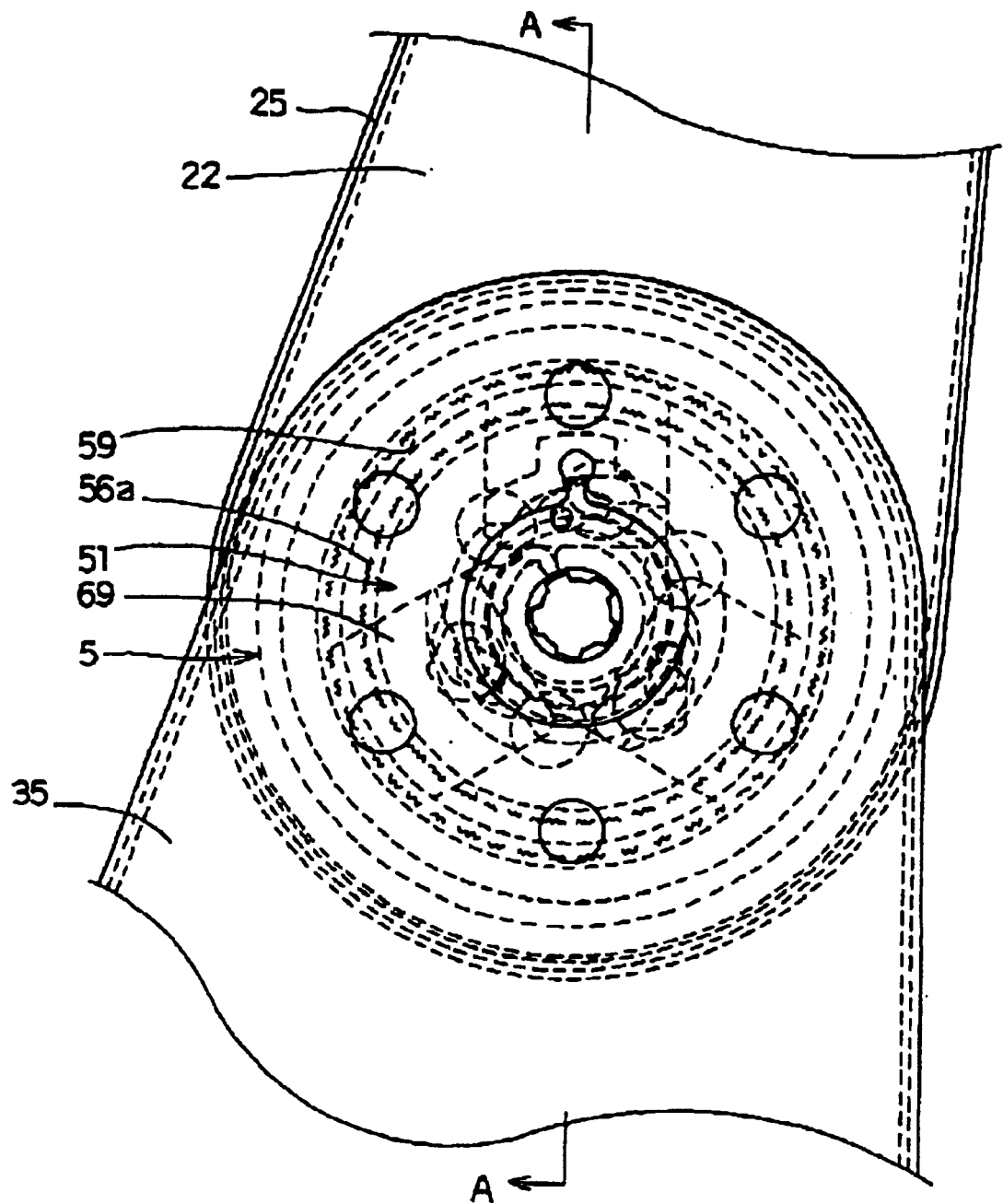
FIG. 2 is a side view of the portion of the seat device according to the embodiment of the present invention.
Figure 3:
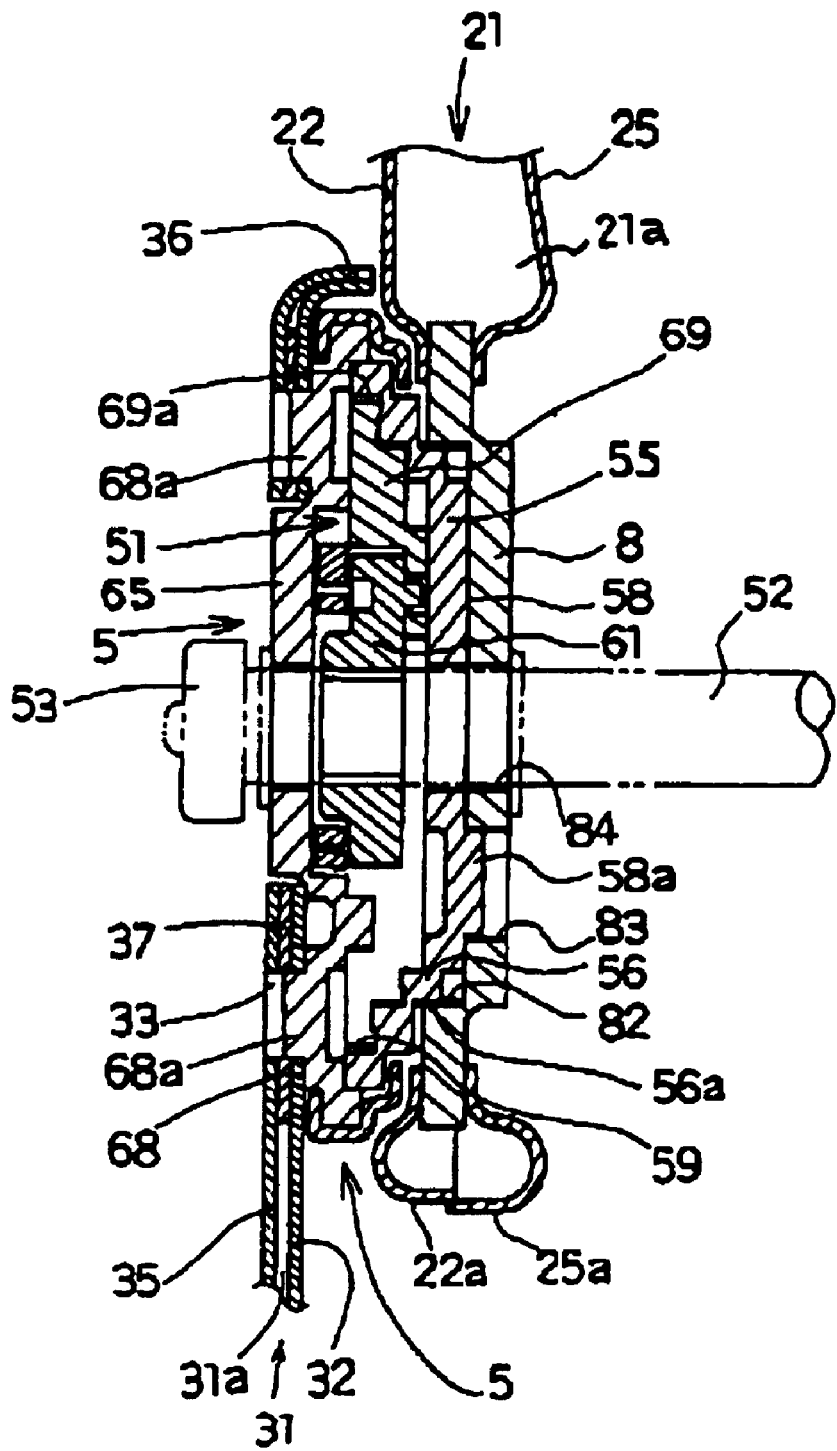
FIG. 3 is a cross-sectional view of the portion of the seat device according to the embodiment of the present invention.

As shown in FIGS. 1–3, the seatback frame 21 includes an inner frame 22 and an outer frame 25 which are welded to be connected to a holder plate (i.e., serving as a reinforcement member) 8 respectively. The inner frame 22 and the outer frame 25 are normally formed by press molding thin steel plates. The inner frame 22 and the outer frame 25 include flange portions 22a, 25a which are opposing each other respectively. Tip ends of the flange portion 22a and the flange portion 25a are welded each other to form a space 21a between the inner frame 22 and the outer frame 25. Thus, the seatback frame 21 has a construction which has large geometrical moment of inertia and has high strength against the distortion. Holes 23, 26 are respectively formed at each bottom end portion of the inner frame 22 and the outer frame 25. Further, extruded portions 24, 27 are formed opposing each other around the respective holes 23, 26 to be projected to the space 21a sides. The circular holder plate 8 is positioned sandwiched by the extruded portions 24, 27 to be welded with the extruded portions 24, 27.

The holder plate 8 is manufactured by press molding the steal plate which is thicker than the inner frame 22 and the outer frame 25. A circular depressed portion 81 is formed by half-die cutting pressing in the central portion of the holder plate 8. A bottom surface of the depressed portion 81 is formed with a shaft hole 84 in the center and plural engaging holes 83 around the shaft hole 84. A plurality of engaging gears (i.e., serving as a portion to be locked) 82 are formed on an internal peripheral surface of the depressed portion 81.

As shown in FIGS. 1–3, the seat cushion frame 31 includes an inner frame 32 and an outer frame 35 which are formed by press molding thin steal plates. The inner frame 32 and the outer frame 33 are welded to be connected each other so that a space 31a is formed between the inner frame 32 and the outer frame 33. The inner frame 32 and the outer frame 35 of the seat cushion frame 31 have an approximately half circle configuration at a top end portion of the seat cushion frame 31. A flange portion 36 for partially surrounding a periphery of the reclining device 5 are formed at a rim portion of the half circle portion. The half circle portion of the seat cushion frame 31 is formed with a shaft hole 34 positioned in the center of the half circle portion and a plurality of engaging holes 33 surrounding the shaft hole 34. As shown in FIG. 3, a reinforcement plate 37 may be provided between the inner frame 32 and the outer frame 35.

As shown in FIGS. 2–3, the reclining device 5 includes an upper arm 55 connected to the seatback frame 21 and a lower arm 65 connected to the seat cushion frame 31. The upper arm 55 and the lower arm 65 are engaged to be relatively rotatable. The lock mechanism 51 for locking the relative rotation between the upper arm 55 and the lower arm 65 is provided between the upper arm 55 and the lower arm 65. The lock mechanism 51 includes a plurality of pawls 69 slidably engaged with the lower arm 65 and includes a cam 61 for actuating the pawl 69. An outer gear 69a is formed on a tip end of the pawl 69. The outer gear 69a is selectively geared with an inner gear 59 formed on the upper arm 55. By operating the operation lever 53, the connection shaft 52 is rotated, the lock mechanisms 51 of the reclining devices 5 are cooperatively operated, and the angular position of the seatback 2 relative to the seat cushion 3 can be adjusted.

As shown in FIG. 1 and FIG. 3, the upper arm 55 of the reclining device 5 includes a depressed portion formed by half-die cutting the steal plate in the plate thickness direction by the pressing. The inner gear 59 selectively geared with the pawl 69 is formed on an internal periphery of the depressed portion of the upper arm 55. As shown in FIG. 3, the central portion of the depressed portion of the upper arm 55 is further deeply formed by half-die cutting in the direction opposite to the lower arm 65 (i.e., right direction of FIG. 3) and a convex portion surface 56 is formed in the direction connected to the seatback frame 21. A locking outer gear (i.e., serving as a locking portion) 56a is formed on the outer periphery of the convex portion surface 56. The locking outer gear 56a is geared with a locking inner gear 82 formed on the holder plate 8. The upper arm 55 is formed with a contact surface 58 for contacting the seatback frame 21 which is further deeply formed by half-die cutting from the convex portion surface 56 (i.e., right direction of FIG. 3). A plurality of bosses (i.e., serving as a projection for locking) 58a are formed on the contact surface 58 to be projected to the seatback frame 21 side. The plural bosses 58a are fitted into locking holes 83 formed on the holder plate 8, and the bosses 58a and the locking holes 83 are welded to be fixed.

On the other hand, the lower arm 65 is also formed by pressing the steal plate likewise the upper arm 55. As shown in FIG. 3 a contact surface 68 is formed on a side surface of the lower arm 65 by half-die cutting at the position opposite to the upper arm 55. The contact surface 68 contacts the seat cushion frame 31. A plurality of bosses 68a fitted into locking holes 33 are formed on the contact surface 68, and the bosses 68a are welded to the cushion frame to be fixed.

As explained above, the seatback frame 21 of the seat device 10 of the embodiment of the present invention constructs the inner frame 22 and the outer frame 25 with thin steal plates to reduce the weight and the holder plate 8 which is made of thick steal plate is applied at the connecting portions with the reclining device 5. In addition, by positioning the welded portions between the holder plate 8 and the inner frame 22 and between the holder plate 8 and the outer frame 25 sufficiently away from the rotation center of the reclining device 5, the seat device is constructed to avoid to apply the excessive load to the welded portions at the collision from front and back thus to improve the strength of the seatback frame 21.

With the seat device 10 according to the embodiment of the present invention, the construction that the bosses 58a formed on the upper arm 55 of the reclining device 5 are welded to be connected to the seatback frame 21 is likewise the known seat device. However, by positioning the locking outer gear 56a being farther away from the rotation center of the reclining device 5 compared to the boss 58a so that the locking outer gear 56a is locked with the locking inner gear 82 of the holder plate 8 to distribute the load applied to the back frame 21, the strength at the connected portions is increased. Because the locking outer gear 56a can be formed approximate to the inner gear 59 of the lock mechanism 51, the locking outer gear 56a can receive the load more effectively than the boss 58a. By appropriately selecting the strength of the gear, the locking of the bosses 58a is abolished and the locking may be achieved only by the locking between the locking outer gear 56a and the locking inner gear 82, which varies the choices for designing.

According to the seat device of the embodiment of the present invention, because the inner gear 59 for the lock mechanism 51 is not formed on the lower arm 65 of the reclining device 5, the bosses 68a can be positioned keeping a sufficient distance from the rotation enter of the reclining device 5. Thus, in the embodiment of the seat device of the present invention, different from the construction of the seatback frame 21, the seat cushion frame 31 is directly connected to the lower arm 65. Notwithstanding, likewise the construction of the seatback frame 21, the lower arm 65 may be connected to the seat cushion frame 31 via the locking gear and the holder plate.

With the seat device according to the embodiment of the present invention, the strength of the seat device can be increased without increasing the weight of the seat device by resolving the weakness of the connected portion between the reclining device and the seat frame which is applied with the large load.

According to the seat device of the embodiment of the present invention, by increasing the strength of the reinforcement member corresponding to the connected portion between the seatback frame and the reclining device or between the seat cushion frame and the reclining device, the strength of the connected portion can be increased. Thus, the strength of the seat frame can be increased without increasing the weight due to the increase of the thickness of the seat frame per se.

According to the seat device of the embodiment of the present invention, by positioning the locking portion and the portion to be locked being away from the rotation center of the reclining device compared to the projection for locking, the connection strength between the reinforcement member and the arm of the reclining device can be ensured.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat device comprising:
   a seat cushion frame provided in a seat cushion;
   a seatback frame provided in a seatback;
   a reclining device far adjusting an angle of the seatback frame relative to the seat cushion frame and including an upper arm connected to the seatback frame, a lower arm rotatably connected to the upper arm and connected to the seat cushion frame and a lock mechanism for locking a rotation of the upper arm relative to the lower arm;
   a locking portion provided on either one of the upper arm and the lower arm;
   a reinforcement member connected by welding to either the seatback frame or the seat cushion frame and opposing said either one of the upper arm or the lower arm provided with the locking portion; and
   a portion to be locked provided on the reinforcement member; wherein the portion to be locked and the locking portion are connected.

2. A seat device according to claim 1, wherein the locking portion and the portion to be locked comprises circular gear portions geared with each other having a center at a rotation center of the reclining device.

3. A seat device according to claim 2, wherein the reinforcement member further includes a plurality of holes and either the upper arm or the lower arm provided with the locking portion includes a plurality of projections fitting into the holes of the reinforcement member.

4. A seat device according to claim 3, wherein the locking portion and the portion to be locked are positioned farther from a rotation center of the reclining device compared to the projections formed on said either one of the upper arm or the lower arm provided with the locking portion.

5. A seat device according to claim 1, wherein the reinforcement member further includes a plurality of holes and said either one of the upper arm or the lower arm provided with the locking portion includes a plurality of projections fitting into the holes of the reinforcement member.

6. A seat device according to claim 5, wherein the locking portion and the portion to be locked are positioned farther from a rotation center of the reclining device compared to the projections formed on said either one of the upper arm or the lower arm provided with the locking portion.

7. A seat device according to claim 1, wherein either the seatback frame or the seat cushion frame include an inner frame and an outer frame which are connected to a peripheral end of the reinforcement member.

8. A seat device according to claim 7, wherein the inner frame and the outer frame are welded to be connected to the reinforcement member.

9. A seat device according to claim 1, wherein the lock mechanism comprises a plurality of pawls each having an outer gear; wherein said either one of the upper arm or the lower arm provided with the locking portion is formed with an inner gear selectively engaged with the outer gear of the pawl; and wherein the locking portion is positioned approximate to the outer gear of the pawl and the inner gear of said either one of the upper arm or the lower arm provided with the locking portion in a radial direction.

10. A seat device according to claim 9, wherein the inner gear of said either one of the upper arm or the lower arm provided with the locking portion is formed by a half-die cutting process.

11. A seat device comprising:
    a seat cushion frame provided in a seat cushion;
    a seatback frame provided in a seatback;
    an upper arm connected to the seatback frame;
    a lower arm rotatably connected to the upper arm and connected to the seat cushion frame;
    a lock mechanism for locking a rotation of the upper arm relative to the lower arm;
    a reclining device for adjusting an angle of the seatback frame relative to the seat cushion frame;
    a locking portion provided on the upper arm;
    a reinforcement member connected by welding to the seatback frame and opposing the upper arm provided with the locking portion; and a portion to be locked provided on the reinforcement member; wherein the portion to be locked and the locking portion are connected.

12. A seat device according to claim 11, wherein the locking portion and the portion to be locked comprises circular gear portions geared with each other having a center at a rotation center of the reclining device.

13. A seat device according to claim 12, wherein the reinforcement member further includes a plurality of holes and the upper arm includes a plurality of projections fitting into the holes of the reinforcement member.

14. A seat device according to claim 13, wherein the locking portion and the portion to be locked are positioned farther from a rotation center of the reclining device compared to the projections formed on the upper arm.

15. A seat device according to claim 11, wherein the reinforcement member further includes a plurality of holes and the upper arm includes a plurality of projections fitting into the holes of the reinforcement member.

16. A seat device according to claim 15, wherein the locking portion and the portion to be locked are positioned farther from a rotation center of the reclining device compared to the projections formed on the upper arm.

17. A seat device according to claim 11, wherein the seatback frame includes an inner frame and an outer frame which are connected to a peripheral end of the reinforcement member.

18. A seat device according to claim 17, wherein the inner frame and the outer frame are welded to be connected to the reinforcement member.

19. A seat device according to claim 11, wherein the lock mechanism comprises a plurality of pawls each having an outer gear; wherein the upper arm is formed with an inner gear selectively engaged with the outer gear of the pawl; and wherein the locking portion is positioned approximate to the outer gear of the pawl and the inner gear of the upper arm in a radial direction.

20. A seat device according to claim 19, wherein the inner gear of the upper arm is formed by a half-die cutting process.

* * * * *